United States Patent
Negishi et al.

(10) Patent No.: US 8,293,824 B2
(45) Date of Patent: Oct. 23, 2012

(54) POLYLACTIC ACID RESIN COMPOSITION

(75) Inventors: Yoshinori Negishi, Saitama (JP); Shigeo Mizokawa, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/919,784

(22) PCT Filed: Feb. 16, 2009

(86) PCT No.: PCT/JP2009/052563
§ 371 (c)(1), (2), (4) Date: Aug. 27, 2010

(87) PCT Pub. No.: WO2009/107504
PCT Pub. Date: Sep. 3, 2009

(65) Prior Publication Data
US 2011/0003917 A1    Jan. 6, 2011

(30) Foreign Application Priority Data
Feb. 29, 2008    (JP) .................................. 2008-050630

(51) Int. Cl.
C08K 5/34    (2006.01)
(52) U.S. Cl. ........................................................ 524/102
(58) Field of Classification Search ................... 524/102
See application file for complete search history.

(56) References Cited

U.S. PATENT DOCUMENTS

| | | | |
|---|---|---|---|
| 5,112,890 A * | 5/1992 | Behrens et al. ............... | 524/95 |
| 7,268,190 B2 * | 9/2007 | Ohme et al. .................. | 525/400 |
| 2007/0260019 A1* | 11/2007 | Ohme et al. .................. | 525/400 |
| 2010/0093888 A1* | 4/2010 | Endo et al. .................... | 523/124 |
| 2010/0190898 A1 | 7/2010 | Negishi et al. | |

FOREIGN PATENT DOCUMENTS

| | | |
|---|---|---|
| CN | 1926107 A | 3/2007 |
| EP | 1 379 587 B1 | 2/2005 |
| EP | 1 978 017 A1 | 10/2008 |
| JP | 49-40557 | 11/1974 |
| JP | 1-113368 A | 5/1989 |
| JP | 6-184417 A | 7/1994 |
| JP | 2004-525185 A | 8/2004 |
| JP | 2005-48077 A | 2/2005 |
| JP | 2007-169191 A | 7/2007 |
| JP | 2007-529467 A | 10/2007 |
| WO | WO 03014224 A1 * | 2/2003 |
| WO | WO 2005/090307 A1 | 9/2005 |
| WO | WO 2006/048389 A1 | 5/2006 |
| WO | WO 2007/074613 A1 | 7/2007 |
| WO | WO 2008/102919 A1 | 8/2008 |

OTHER PUBLICATIONS

International Search Report, dated Mar. 17, 2009 and issued in PCT/JP2009/052563.
Chinese Office Action dated Mar. 26, 2012 for Application No. 200980105669.4.

* cited by examiner

*Primary Examiner* — Kriellion Sanders
(74) *Attorney, Agent, or Firm* — Birch, Stewart, Kolasch & Birch, LLP

(57) ABSTRACT

Provided are a polylactic acid resin composition which has a superior weatherability while inhibiting crystallization, and a resin molded article using this polylactic acid resin composition.

The polylactic acid resin composition according to the present invention is a polylactic acid resin composition in which a hindered amine compound having a partial structure represented by the following General Formula (1):

$$\underset{R^4\quad R^3}{\overset{R^1\quad R^2}{>}}\!\!N\!-\!O\!-\!R \qquad (1)$$

(wherein, $R^1$, $R^2$, $R^3$ and $R^4$ each independently represents a $C_1$ to $C_4$ alkyl group; and R represents a $C_1$ to $C_{18}$ alkyl group, $C_1$ to $C_{18}$ acyl group or $C_5$ to $C_8$ cycloalkyl group, which is optionally substituted with a hydroxyl group)
is blended at an amount of 0.005 to 30 parts by mass with respect to 100 parts by mass of polylactic acid resin. The resin molded article according to the present invention is obtained by molding this polylactic acid resin composition.

9 Claims, No Drawings

POLYLACTIC ACID RESIN COMPOSITION

TECHNICAL FIELD

The present invention relates to a polylactic acid resin composition (hereinafter, also simply referred to as "resin composition"). Particularly, the present invention relates to a polylactic acid resin composition containing a hindered amine compound which has a specific structure.

BACKGROUND ART

Polylactic acid resins have a high melting point and can be melt-molded; therefore, they have been investigated for various applications as a biodegradable polymer having a superior practicality. However, polylactic acid resins have a problem in their weatherability and, for instance, there is a problem in that polylactic acid resins become markedly deteriorated when left under the sun.

Meanwhile, it is known that hindered amine compounds serve as an effective additive in stabilization of many organic substrates containing polymer against adverse effects of light and oxygen. For example, Patent Document 1 discloses to blend an ultraviolet absorbing agent or hindered amine compound into a polylactic acid resin.

In addition, disclosed in Patent Document 2 as a weakly basic hindered amine compound is a compound having an alkyloxyamine structure. Further, disclosed in Patent Document 3 as weakly basic hindered amine compounds having various skeletons are hindered amine compounds having carboxylic acid ester structure, amide structure, carbamate structure and acetal structure.

Patent Document 1: Japanese Unexamined Patent Application Publication No. H6-184417
Patent Document 2: Japanese Examined Patent Application Publication No. S49-40557
Patent Document 3: Japanese Unexamined Patent Application Publication No. H1-113368

DISCLOSURE OF THE INVENTION

Problems to be Solved by the Invention

However, the weatherability improving effect of the hindered amine compound disclosed in Patent Document 1 for the polylactic acid resin is not sufficient, and there is also a problem that an addition of the hindered amine compound facilitates crystallization of the polylactic acid resin, thereby making the molded article obtained by molding become clouded.

Further, Patent Documents 2 and 3 offer no concrete description on the application of the hindered amine compounds for a polylactic acid resin and there is no description at all regarding the crystallization inhibiting effect of polylactic acid resins. Furthermore, even when hindered amine compounds proposed in conventional arts, such as those disclosed in these Patent Documents, were used for a polylactic acid resin, a sufficient weatherability improving effect could not be attained.

Accordingly, an object of the present invention is to provide a polylactic acid resin composition which solves the aforementioned problems and has a superior weatherability while inhibiting crystallization, as well as a resin molded article using this polylactic acid resin composition.

Means for Solving the Problems

In order to solve the aforementioned problems, the present inventors intensively studied to discover that a polylactic acid resin composition in which the weatherability is improved and crystallization is inhibited, as well as a resin molded article thereof, can be obtained by blending a polylactic acid resin with a hindered amine compound having a specific structure, thereby completing the present invention.

That is, the polylactic acid resin composition of the present invention, wherein a hindered amine compound having a partial structure represented by the following General Formula (1):

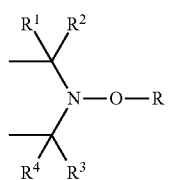

(1)

(wherein, $R^1$, $R^2$, $R^3$ and $R^4$ each independently represents a $C_1$ to $C_4$ alkyl group; and R represents a $C_1$ to $C_{18}$ alkyl group, $C_1$ to $C_{18}$ acyl group or $C_5$ to $C_8$ cycloalkyl group, which is optionally substituted with a hydroxyl group)
is blended at an amount of 0.005 to 30 parts by mass with respect to 100 parts by mass of polylactic acid resin.

In the polylactic acid resin composition of the present invention, it is preferred that the hindered amine compound having a partial structure represented by the aforementioned General Formula (1) be a compound represented by the following General Formula (2):

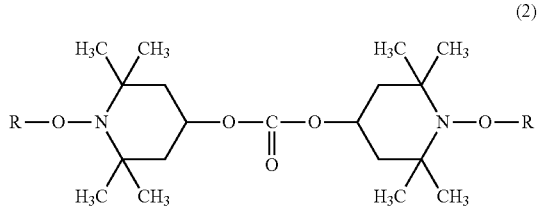

(2)

(wherein, R is the same as in the aforementioned General Formula (1)).

Further, the resin molded article of the present invention is characterized in that it is obtained by molding the aforementioned polylactic acid resin composition of the present invention.

Effects Of The Invention

By having the aforementioned constitution, the present invention enabled a polylactic acid resin composition having a superior weatherability while inhibiting crystallization. Accordingly, the resin molded article using this polylactic acid resin composition has a superior weatherability and does not have a problem of cloudiness caused by crystallization.

BEST MODE FOR CARRYING OUT THE INVENTION

The polylactic acid resin composition of the present invention will be described in more detail.

As the polylactic acid resin used in the present invention, polylactic acid homopolymers, polylactic acid copolymers and blend polymers of a polylactic acid homopolymer and polylactic acid copolymer can be exemplified. Further, the polylactic acid resin used in the present invention may also be a blend polymer whose main component is polylactic acid, as long as the effects of the present invention are not impaired.

The weight-average molecular weight (Mw) of such polylactic acid resin in terms of a polystyrene-converted value by gel permeation chromatography analysis is usually 50,000 to 500,000, preferably 100,000 to 250,000. It is difficult to attain practically-required physical properties when the weight-average molecular weight is less than 50,000, and the moldability may be likely to become impaired when the weight-average molecular weight exceeds 500,000.

Further, the molar ratio (L/D) of L-lactic acid unit and D-lactic acid unit in the aforementioned polylactic acid resin is not particularly restricted and may be selected from the range of 100/0 to 0/100. The amount of either L-lactic acid unit or D-lactic acid unit is set at not less than 75 mol % in order to obtain a polylactic acid resin composition having a high melting point, and it is preferred that the amount of either L-lactic acid unit or D-lactic acid unit be set at not less than 90 mol % in order to obtain a polylactic acid resin composition having a higher melting point.

Furthermore, as the polylactic acid resin in the present invention, copolymers of lactic acid monomers or lactides with other copolymerizable component(s) are preferred. Examples of such other component include dicarboxylic acids, polyalcohols, hydroxycarboxylic acids and lactonic acids, which have at least two ester bond-forming functional groups; and various polyesters, polyethers, polycarbonates and the like, which have those compounds as a constituent.

Examples of the aforementioned dicarboxylic acid include succinic acid, adipic acid, azelaic acid, sebacic acid, terephthalic acid and isophthalic acid.

Further, examples of the aforementioned polyalcohol include aromatic polyalcohols such as those obtained by addition reaction of ethylene oxide to bisphenol; aliphatic polyalcolols such as ethylene glycols, propylene glycols, butanediols, hexanediols, octanediols, glycerins, sorbitans, trimethylolpropanes and neopentylglycols; and ether glycols such as diethylene glycols, triethylene glycols, polyethylene glycols and polypropylene glycols.

Furthermore, examples of the aforementioned hydroxycarboxylic acid include glycolic acid, hydroxybutyric acid, hydroxybutylcarboxylic acid, hydroxypentanoic acid, hydroxycaproic acid and hydroxyheptanoic acid.

Still Further, examples of the aforementioned lactonic acid include glycolide, ε-caprolactone glycolide, ε-caprolactone, ε-propiolactone, δ-butyrolactone, β-butyrolactone, γ-butyrolactone, pivalolactone and δ-valerolactone.

The method of synthesizing the polylactic acid resin used in the present invention is not particularly restricted. The polylactic acid resin used in the present invention can be synthesized by a conventionally known method, for example, by direct dehydration condensation from lactic acid monomers or ring-opening polymerization of lactic acid cyclic dimer lactides.

In cases where direct dehydration condensation is carried out, any of L-lactic acid, D-lactic acid, DL-lactic acid and a mixture thereof may be used. Further, in cases where ring-opening polymerization is carried out, any of L-lactide, D-lactide, DL-lactide, meso-lactide and a mixture thereof may be used.

The catalyst used in the polymerization reaction for obtaining the aforementioned polylactic acid resin is not particularly restricted, and any known lactic acid polymerization catalyst may be used. Examples of such catalyst include tin compounds such as tin lactate, tin tartrate, tin dicaprylate, tin dilaurate, tin dipalmitate, tin distearate, tin dioleate, α-tin naphthoate, β-tin naphthoate and tin octylate; tin powder; tin oxide; zinc powder; zinc halide; zinc oxide; organo-zinc compound; titanium compounds such as tetrapropyl titanate; zirconium compounds such as zirconium isopropoxide; antimony compounds such as antimony trioxide; bismuth compounds such as bismuth (III) oxide; and aluminum compounds such as aluminum oxide and aluminum isopropoxide.

From the standpoint of the activity, especially preferred thereamong are catalysts comprising tin or a tin compound. The amount of the aforementioned catalyst is, for example, in cases where ring-opening polymerization is carried out, approximately 0.001 to 5 parts by mass with respect to 100 parts by mass of lactide.

The temperature at which the polymerization reaction can be carried out varies depending on the type of the catalyst when the aforementioned catalyst is present; however, it is usually 100 to 220° C. In addition, it is also preferred to carry out, for example, the two-step polymerization disclosed in Japanese Unexamined Patent Application Publication No. H7-247345.

Further, as the aforementioned blend polymer whose main component is polylactic acid resin, mixtures obtained by mixing and melting a polylactic acid homopolymer and/or polylactic acid copolymer with an aliphatic polyester other than polylactic acids (hereinafter, simply referred to as "aliphatic polyester") can be exemplified. It is preferred to blend the aforementioned aliphatic polyester since it can impart flexibility and impact resistance to the molded article. The mixing ratio of the aforementioned blend polymer is usually approximately 10 to 100 parts by mass of the aforementioned aliphatic polyester with respect to 100 parts by mass of the polylactic acid homopolymer and/or polylactic acid copolymer.

The aforementioned aliphatic polyester may be of one polymer or a combination of two or more polymers. Examples of such polymers include polymers of an aliphatic carboxylic acid and aliphatic alcohol, and aliphatic hydroxycarboxylic acid polymers obtained by ring-opening polymerization of a cyclic anhydride such as ε-caprolactone. Examples of the method of obtaining such these polymers include direct polymerization methods in which a high-molecular weight product is obtained by direct polymerization, and indirect polymerization methods in which a high-molecular weight product is obtained using a chain-extending agent or the like after polymerization to an oligomer level. Further, the aforementioned aliphatic polyester may be a copolymer or a mixture with other resin(s), as long as the polymer's main component is the aforementioned aliphatic monomer.

Further, it is preferred that such aliphatic polyester be a polymer comprising an aliphatic dicarboxylic acid and aliphatic diol. Examples of the aliphatic dicarboxylic acid include succinic acid, adipic acid, suberic acid, sebacic acid, dodecanoic acid, and anhydrides and derivatives thereof. Furthermore, examples of the aliphatic diol include glycol compounds such as ethylene glycol, butanediol, hexanediol, octanediol and cyclohexanedimethanol, and derivatives thereof. All of these aliphatic dicarboxylic acids and aliphatic diols are preferably a $C_2$ to $C_{10}$ alkylene or a monomer having a cycloalkylene. It is preferred that the aforementioned aliphatic polyester be produced by polycondensation of monomer components selected from each of these aliphatic dicarboxylic acids and aliphatic diols. Moreover, two or more types may be selected for each of the aforementioned aliphatic dicarboxylic acids and aliphatic diols.

Further, in order to improve the melt viscosity by providing a branching in the aforementioned polymer used as the aliphatic polyester, a polyfunctional carboxylic acid, alcohol or hydroxycarboxylic acid, which has at least three functional groups, may be used as the monomer component constituting the aforementioned polymer. However, when a large amount of these polyfunctional monomer components is used, the resulting polymer may have a cross-linked structure and become non-thermoplastic, and there may be cases where, even when the polymer remains thermoplastic, microgel having a highly-cross-linked structure is formed partially. Therefore, the ratio of these polyfunctional monomer components included in the polymer is small and they are used at an amount which does not notably affect the chemical and physical properties of the polymer. As such polyfunctional monomer component, malic acid, tartaric acid, citric acid, trimellitic acid, pyromellitic acid, pentaerythrit, trimethylolpropane or the like may be used.

Among the methods of producing the polymer used as the aforementioned aliphatic polyester, the aforementioned direct polymerization method is a method in which a high-molecular weight product is obtained by selecting a monomer component and removing the water content included in the monomer component or generated during the polymerization thereof. Further, in the aforementioned indirect polymerization method, after selecting a monomer component and polymerizing it to an oligomer level, the molecular weight of the resultant is increased by using a small amount of chain-extending agent, for example, a diisocyanate compound such as hexamethylene diisocyanate, isophorone diisocyanate, xylene diisocyanate and diphenylmethane diisocyanate. In addition to these methods, for example, a method of obtaining an aliphatic polyester carbonate using a carbonate compound may be employed.

Furthermore, in the polylactic acid resin composition of the present invention, the aforementioned lactic acid polymer may be blended, as required, with a widely-used resin other than lactic acid polymers in order to improve the impact strength and the like. As such widely-used resin, those resins having elasticity, such as ethylene-propylene copolymer rubber and ethylene-propylene-diene copolymer, are preferred.

In the hindered amine compound used in the present invention, examples of the $C_1$ to $C_4$ alkyl group represented by $R^1$, $R^2$, $R^3$ and $R^4$ in the aforementioned Formula (1) include methyl group, ethyl group, propyl group, isopropyl group, n-butyl group, sec-butyl group and tert-butyl group.

In the hindered amine compound used in the present invention, examples of $C_1$ to $C_{18}$ alkyl group represented by R in the aforementioned Formula (1) include methyl group, ethyl group, propyl group, isopropyl group, butyl group, sec-butyl group, tert-butyl group, isobutyl group, amyl group, isoamyl group, tert-amyl group, hexyl group, 2-hexyl group, 3-hexyl group, heptyl group, 2-heptyl group, 3-heptyl group, isoheptyl group, tert-heptyl group, n-octyl group, isooctyl group, tert-octyl group, 2-ethylhexyl group, nonyl group, isononyl group, decyl group, undecyl group, dodecyl group, tridecyl group, tetradecyl group, pentadecyl group, hexadecyl group, heptadecyl group and octadecyl group.

In the hindered amine compound used in the present invention, examples of the $C_1$ to $C_{18}$ alkyl group substituted by a hydroxyl group, which is represented by R in the aforementioned General Formula (1), include those groups corresponding to the aforementioned alkyl group, such as 2-hydroxyethyl group, 2-hydroxypropyl group, 3-hydroxypropyl group and 2-hydroxy-2-methylpropyl group.

In the hindered amine compound used in the present invention, examples of the $C_1$ to $C_{18}$ acyl group represented by R in the aforementioned General Formula (1) include acetyl group, propanoyl group, butanoyl group, pentanoyl group, hexanoyl group, heptanoyl group, octanoyl group, decanoyl group, undecanoyl group, dodecanoyl group, tridecanoyl group, tetradecanoyl group, pentadecanoyl group, hexadecanoyl group, heptadecanoyl group and octadecanoyl group.

In the hindered amine compound used in the present invention, examples of the $C_5$ to $C_8$ cycloalkyl group represented by R in the aforementioned General Formula (1) include cyclopentyl group, cyclohexyl group, cycloheptyl group and cyclooctyl group.

More specific examples of the hindered amine compound used in the present invention, which has a partial structure represented by the aforementioned General Formula (1), include the following Compounds No. 1 to No. 8. However, the present invention is not restricted to the following compounds.

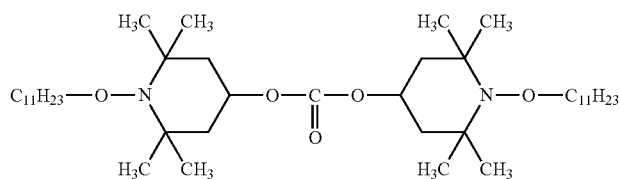

Compound No. 1

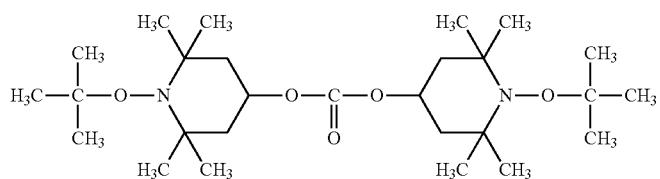

Compound No. 2

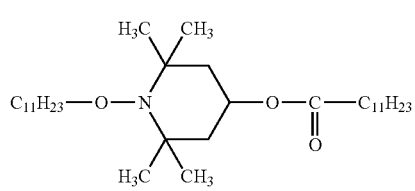

Compound No. 3

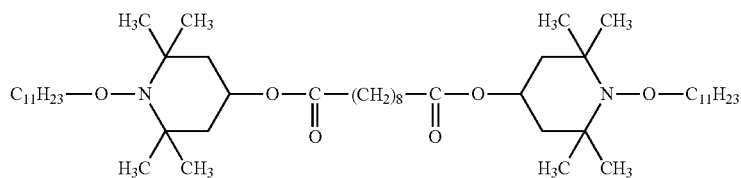

Compound No. 4

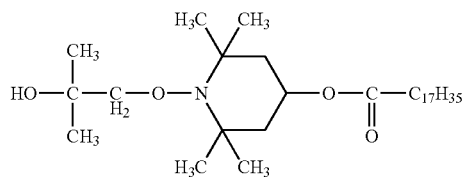

Compound No. 5

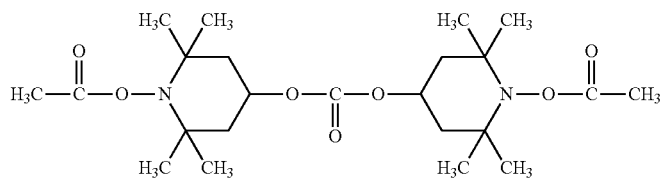

Compound No. 6

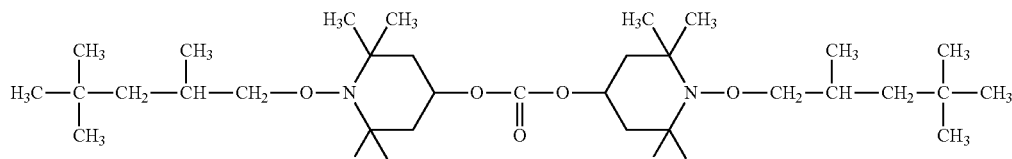

Compound No. 7

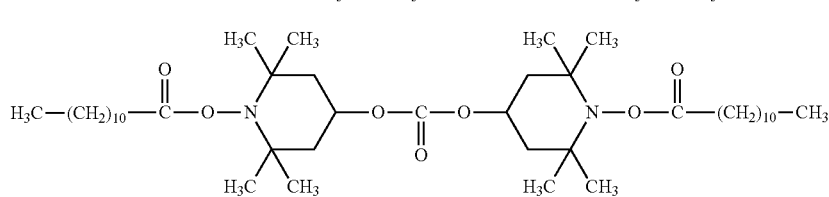

Compound No. 8

In the polylactic acid resin composition of the present invention, the hindered amine compound having a partial structure represented by the aforementioned General Formula (1) is blended at an amount of 0.005 to 30 parts by mass, preferably 0.05 to 10 parts by mass, more preferably 0.1 to 5 parts by mass, with respect to 100 parts by mass of the polylactic acid resin. The effect of such addition is not sufficient when the amount of the hindered amine compound is less than 0.005 parts by mass, while a phenomenon such as effusion of the aforementioned compounds may occur on the surface of the polylactic acid resin composition when the amount of the hindered amine compound is more than 30 parts by mass.

Further, in the polylactic acid resin composition of the present invention, as required, various additives which are commonly used in a variety of resins are added. Examples of such additive include phenolic antioxidants, sulfur-based antioxidants, phosphorous-based antioxidants, ultraviolet absorbing agents, other hindered amine compounds, nucleating agents, flame retardants, flame-retardant aids, hydrotalcites, lubricants and fillers.

Examples of the aforementioned phenolic antioxidant include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl) phosphonate, tridecyl-3,5-di-tert-butyl-4-hydroxybenzyl thioacetate, thiodiethylene-bis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methyl benzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3,5-di-tert-butyl-4-hydroxyphenyl) propionate]methane, 2-tert-butyl-4-methyl-6-(2-acroyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane] and triethylene glycol-bis(β-(3-tert-butyl-4-hydroxy-5-methylphenyl)propionate).

The amount of the aforementioned phenolic antioxidant used is 0.001 to 10 parts by mass, preferably 0.01 to 5 parts by mass, with respect to 100 parts by mass of the polylactic acid resin.

Examples of the aforementioned sulfur-based antioxidant include dialkyl thiodipropionates, such as dilauryl of thiodipropionic acid, dimyristyl, myristylstearyl and distearyl ester, and β-alkylmercaptopropionates of polyols such as pentaerythritol tetra(β-dodecylmercaptopropionate).

The amount of the aforementioned sulfur-based antioxidant used is 0.001 to 10 parts by mass, preferably 0.01 to 5 parts by mass, with respect to 100 parts by mass of the polylactic acid resin.

Examples of the aforementioned phosphorous-based antioxidant include triphenyl phosphite, tris(2,4-di-tert-butylphenyl)phosphite, tris(nonylphenyl)phosphite, tris(dinonylphenyl)phosphite, tris(mono-, di-mixed nonylphenyl) phosphite, bis(2-tert-butyl-4,6-dimethylphenyl).ethyl phosphite, diphenyl acid phosphite, 2,2'-methylene-bis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithio phosphite, bis(neopenthyl glycol).1,4-cyclohexanedimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, tetra(C12-15 mixed alkyl)-4,4'-isopropylidene diphenyl phosphite, bis[2,2'-methylene-bis(4,6-diamylphenyl)]. isopropylidene diphenyl phosphite, hydrogenated-4,4'-isopropylidene diphenol polyphosphite, tetra(tridecyl).4,4'-butylidene-bis(2-tert-butyl-5-methylphenol)diphosphite, hexa(tridecyl)-1,1,3-tris(2-methyl-5-tert-butyl-4-hydroxyphenyl)butane triphosphonite, 9,10-dihydro-9-oxa-10-phosphaphenanthrene-10-oxide and 2-butyl-2-ethyl-propanediol-2,4,6-tri-tert-butylphenol monophosphite.

The amount of the aforementioned phosphorous-based antioxidant used is 0.001 to 10 parts by mass, preferably 0.01 to 5 parts by mass, with respect to 100 parts by mass of the polylactic acid resin.

Especially, those phenolic antioxidants and phosphorous-based antioxidants are suitably used since they prevent the coloration of the polylactic acid resin.

Examples of the aforementioned ultraviolet absorbing agent include 2-hydroxybenzophenones such as 2,4-dihydroxybenzophenone, 2-hydroxy-4-methoxybenzophenone, 2-hydroxy-4-octoxybenzophenone, 2-hydroxy-4-tert-butyl-4'-(2-methacroyloxyethoxyethoxy)benzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-$C_7$ to $C_9$ mixed-alkoxycarbonylethylphenyl)triazole, 2-(2-hydroxy-3,5-dicumylphenyl)benzotriazole, and polyethylene glycol ester of 2-(2-hydroxy-3-tert-butyl-5-carboxyphenyl)benzotriazole; 2-(2-hydroxyphenyl)-1,3,5-triazines such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine, 2-(2-hydroxy-4-acryloyloxyethoxyphenyl)-4,6-bis(2,4-dimethylphenyl)-1,3,5-triazine and 2-(2-hydroxy-4-(2-ethylhexyloxyloyloxyethoxyphenyl)-4,6-bis(2,4-dimethylphenyl)-1,3,5-triazine; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate. The amount of the aforementioned ultraviolet absorbing agent used is preferably 0.001 to 10 parts by mass, more preferably 0.01 to 5 parts by mass, with respect to 100 parts by mass of the polylactic acid resin.

Examples of the aforementioned other hindered amine compound include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl)-1,2,3,4-butanetetracarboxylate, tetrakis (1,2,2,6,6-pentamethyl-4-piperidyl)-1,2,3,4-butanetetracarboxylate, bis(2,2,6,6-tetramethyl-4-piperidyl).-bis(tridecyl)-1,2,3,4-butanetetracarboxylate, bis(1,2,2,6,6-pentamethyl-4-piperidyl).-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8, 10-tetraoxaspiro[5.5]undecane, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 1-(2-hydroxyethyl)-2,2,6,6-tetramethyl-4-piperidinol/diethyl succinate polycondensate, and 1,6-bis(2,2,6,6-tetramethyl-4-piperidylamino)hexane/dibromoethane polycondensate.

The amount of the aforementioned other hindered amine compound used is 0.001 to 10 parts by mass, preferably 0.01 to 5 parts by mass, with respect to 100 parts by mass of the aforementioned polylactic acid resin.

Examples of the aforementioned nucleating agent include aromatic metal carboxylates such as aluminum p-t-butylbenzoate and sodium benzoate; acidic metal phosphates such as bis(2,4-di-tert-butylphenyl) sodium phosphate, bis (2,4-di-tert-butylphenyl) lithium phosphate and sodium-2,2'-methylene-bis(4,6-di-tert-butylphenyl) phosphate; and polyalcohol derivatives such as dibenzylidene sorbitol, bis (methylbenzylidene) sorbitol, bis (p-ethylbenzylidene) sorbitol and disodium bicyclo[2.2.1]heptane-2,3-dicarboxylate. The amount of the aforementioned nucleating agent used is 0.001 to 10 parts by mass, preferably 0.01 to 5 parts by mass, with respect to 100 parts by mass of the aforementioned polylactic acid resin.

Examples of the aforementioned flame retardant include phosphoric esters such as triphenyl phosphate, phenol, resorcinol, phosphoryl oxychloride condensate, phenol, bisphenol A, 2,6-xylenol, resorcinol and phosphoryl oxychloride condensate; phosphoamides such as aniline, phosphoryl oxychloride condensate, phenol and xylenediamine phosphorus oxychloride condensate; phosphazenes; halogen flame retardant such as decabromodiphenyl ether and tetrabromobisphenol A; phosphates of nitrogen-containing organic compound, such as melamine phosphate, piperazine phosphate, melamine pyrophosphate, piperazine pyrophosphate, melamine polyphosphate and piperazine polyphosphate; red phosphorus and surface-treated or micro-encapsulated red phosphorus; flame-retardant aids such as antimony oxides and zinc borates; and anti-drip agents such as polytetrafluoroethylenes and silicon resins. The amount of the aforementioned flame retardant used is preferably 1 to 30 parts by mass, more preferably 5 to 20 parts by mass, with respect to 100 parts by mass of the aforementioned polylactic acid resin.

The aforementioned hydrotalcites may be natural or synthetic, and it can be used regardless of the presence or absence of surface treatment and crystallized water molecules. Examples thereof include basic carbonate salts represented by the following General Formula (3):

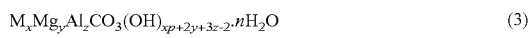
$$M_xMg_yAl_zCO_3(OH)_{xp+2y+3z-2} \cdot nH_2O \quad (3)$$

(wherein, M represents an alkali metal or zinc; x represents a number of 0 to 6; y represents a number of 0 to 6; z represents a number of 0.1 to 4; p represents the valency of M; and n represents 0 to 100 crystallized water molecules). The amount of the aforementioned hydrotalcites used is preferably 0.001 to 10 parts by mass, more preferably 0.01 to 5 parts by mass, with respect to 100 parts by mass of the polylactic acid resin.

Examples of the aforementioned lubricant include fatty acid amides such as laurylamides, myristylamides, stearylamides and behenylamides; ethylene-bis-stearylamide; polyethylene waxes; metallic soaps such as calcium stearate and magnesium stearate; and metal phosphates such as magnesium distearyl phosphate and magnesium stearyl phosphate. The amount of the aforementioned lubricant used is preferably 0.001 to 10 parts by mass, more preferably 0.01 to 5 parts by mass, with respect to 100 parts by mass of the polylactic acid resin.

Examples of the aforementioned fillers include inorganic materials such as talc, silica, calcium carbonate, glass fiber, potassium titanate and potassium borate. Such filler is used by appropriately selecting the particle diameter in the case of a spherical article, or fiber diameter, fiber length and aspect ratio in the case of a fibrous article. Further, it is preferred that a surface-treated filler be used as required. The amount of the aforementioned filler used is preferably 0.1 to 100 parts by mass, more preferably 5 to 80 parts by mass, with respect to 100 parts by mass of the polylactic acid resin.

In addition to the above, as required, additives that are generally used may be used in the present invention, and examples thereof include coloring agents, cross-linking agents, antistatic agents, anti-plate-out agents, surface treatment agents, fluorescent agents, antifungal agents, antibacterial agents, metallic soap, metal inactivators, releasing agents, pigments, dyes, processing aids and foaming agents.

As the method of adding the aforementioned other additive(s) which is/are used as required, for example, use may be made of a method in which the additive(s) and the hindered amine compound used in the present invention, which has a partial structure represented by the aforementioned General Formula (1), are added separately to the aforementioned polylactic acid resin; a method in which the hindered amine compound having a partial structure represented by the aforementioned General Formula (1) is mixed in advance with, for example, a granulation aid used as required, such as binder, wax, solvent or silica, at a desired ratio, followed by granulation of the resulting mixture into one-pack additive complex, which is subsequently added to the polylactic acid resin; or a method in which a master batch containing the hindered amine compound having a partial structure represented by the aforementioned General Formula (1) and the aforementioned other additive(s) is prepared, which master batch is subsequently added to the polylactic acid resin.

The resin molded article according to the present invention is obtained by molding the aforementioned polylactic acid resin composition, so that the resin molded article has a superior weatherability and is different from those molded articles using a conventional polylactic acid resin composition in that there is no problem of cloudiness caused by crystallization. The method of molding such resin composition can be appropriately selected depending on the application and is not particularly restricted. Examples thereof include injection molding, extrusion molding, co-extrusion molding, blow molding, press molding, cast molding, roll molding and vacuum molding.

Also, the application of the resin molded article according to the present invention is not particularly restricted. Examples thereof include building materials such as window sashes; resin parts for electric appliances such as frame portions or frames of personal computers, cellular phones, other office automation devices and home electric appliances; and resin parts for automobiles such as bumpers, spoilers, side visors, dashboards, glove boxes, console boxes, radiator grills, aero parts, instrument panels, headliners, doors, seats and trunk compartments. Further, the resin molded article according to the present invention can be made into a film, sheet, hollow molded article and the like.

EXAMPLES

The present invention will be described in more detail by way of Examples; however, the present invention is not limited thereto.

Example 1

Comparative Examples 1 to 3

Added to a 25 ml measuring flask were 1.25 g of polylactic acid resin (LACER H-100; manufactured by Mitsui Chemicals, Inc.) and 0.375 mg of a hindered amine compound described in Table 1 below, and methylene chloride was then added thereto to increase the volume. The thus obtained solution was placed in a petri dish at an amount of 4 ml and the solvent was subsequently removed, thereby preparing a test piece of casted film having a thickness of 70 to 90 μm. Using the thus obtained test piece, the following evaluations were carried out.

(1) Time of Cracking

In order to evaluate the weatherability of the obtained test piece, the surface of test piece was observed every 120 hours in a sunshine carbon-arc weather meter manufactured by Suga Test Instruments Co., Ltd. (black panel temperature at 63° C., water shower for 18 minutes in every 120 minutes) to determine the time at which a crack occurred on the test piece surface. The results are shown in Table 1 below.

(2) Crystallization Condition

The crystallization condition of the obtained test piece was evaluated in terms of the Haze value (%) by removing the test piece every 360 hours during the aforementioned weatherability test. It should be noted here that the Haze value increases and the test piece becomes clouded as the crystallization of the test piece progresses. The results are shown in Table 1 below.

Comparative Example 4

In accordance with the formulation of Table 1 below, a test piece was prepared in the same manner as in the aforementioned Example 1 and Comparative Examples 1 to 3, except that no hindered amine compound was added, and the weatherability thereof was evaluated. The results are shown in Table 1 below.

TABLE 1

|  |  | Example 1 | Comparative Example 1 | Comparative Example 2 | Comparative Example 3 | Comparative Example 4 |
|---|---|---|---|---|---|---|
| Hindered Amine Compound | Compound No. 1[1] | 0.3 | — | — | — | — |
|  | Comparative Compound 1[2] | — | 0.3 | — | — | — |
|  | Comparative Compound 2[3] | — | — | 0.3 | — | — |
|  | Comparative Compound 3[4] | — | — | — | 0.3 | — |
| Weatherability Evaluation | Time of Cracking (hr) | 1440 | 1080 | 1440 | 1320 | 1200 |
|  | Crystallization Condition Haze (%) 360 hr | 6.6 | 56.9 | 15.2 | 5.2 | 45.7 |
|  | 720 hr | 9.9 | 39.8 | 17.6 | 9.4 | 58.3 |
|  | 1080 hr | 12.7 | —[5] | 19.7 | 10.6 | 55.2 |

[1] Compound No. 1

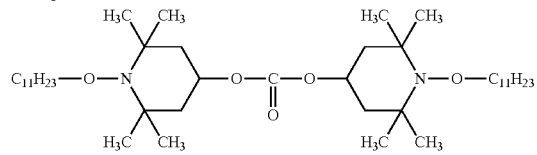

[2] Comparative Compound 1

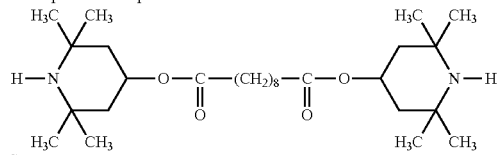

[3] Comparative Compound 2

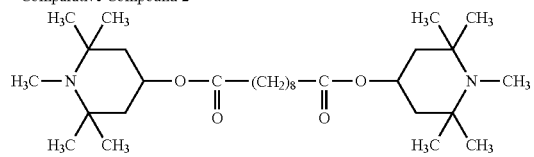

[4] Comparative Compound 3

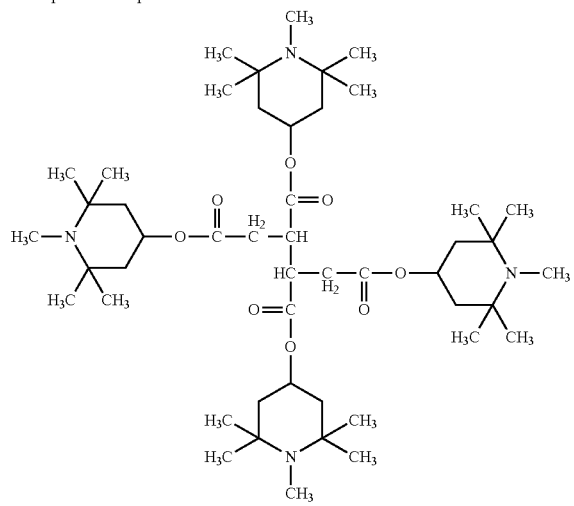

[5] The Haze was not able to be measured due to occurrence of cracking.

According to the results shown in the above Table 1, it was confirmed that, compared to the polylactic acid resin compositions of Comparative Examples 1 to 3 in which a conventional hindered amine compound was used, the polylactic acid resin composition of Example 1 in which the hindered amine compound having a partial structure represented by the aforementioned General Formula (1) was used had a superior weatherability and also attained the effect to inhibit the crystallization of the polylactic acid resin.

The invention claimed is:

1. A polylactic acid resin composition, wherein a hindered amine compound having a structure represented by the following General Formula (2):

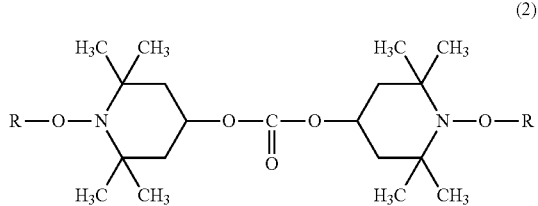

(2)

wherein, R represents a $C_1$ to $C_{18}$ alkyl group, $C_1$ to $C_{18}$ acyl group or $C_5$ to $C_8$ cycloalkyl group, which is optionally substituted with a hydroxyl group, is blended at an amount of 0.005 to 30 parts by mass with respect to 100 parts by mass of polylactic acid resin.

2. A resin molded article, which is obtained by molding the polylactic acid resin composition according to claim 1.

3. The polylactic acid resin composition according to claim 1, wherein the polylactic acid resin is a polylactic acid homopolymer, polylactic acid copolymer or a blend of the polylactic acid homopolymer and the polylactic acid copolymer.

4. The polylactic acid resin composition according to claim 1, wherein the polylactic acid resin is a polylactic acid homopolymer.

5. The polylactic acid resin composition according to claim 3, wherein the weight-average molecular weight of the polylactic acid resin in terms of a polystyrene-converted value by gel permeation chromatography analysis is 50,000 to 500,000.

6. The polylactic acid resin composition according to claim 3, wherein the polylactic acid resin is a polylactic acid copolymer of lactic acid monomers or lactides with other copolymerizable component(s).

7. The polylactic acid resin composition according to claim 1, wherein R in the Formula (2) is methyl group, ethyl group, propyl group, isopropyl group, butyl group, sec-butyl group, tert-butyl group, isobutyl group, amyl group, isoamyl group, tert-amyl group, hexyl group, 2-hexyl group, 3-hexyl group, heptyl group, 2-heptyl group, 3-heptyl group, isoheptyl group, tert-heptyl group, n-octyl group, isooctyl group, tert-octyl group, 2-ethylhexyl group, nonyl group, isononyl group, decyl group, undecyl group, dodecyl group, tridecyl group, tetradecyl group, pentadecyl group, hexadecyl group, heptadecyl group or octadecyl group.

8. The polylactic acid resin composition according to claim 1, wherein R in the Formula (2) is nonyl group, isononyl group, decyl group, undecyl group, dodecyl group, tridecyl group, tetradecyl group, pentadecyl group, hexadecyl group, heptadecyl group or octadecyl group.

9. The polylactic acid resin composition according to claim 1, wherein the hindered amine compound is

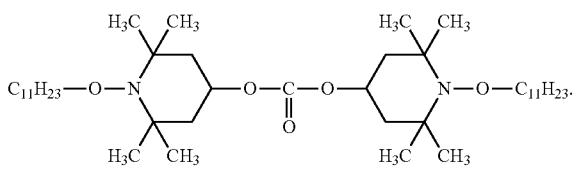

* * * * *